May 30, 1967
L. A. GIONDI
3,322,313
BICYCLE CARRIER BASKET COVER
Filed Jan. 21, 1966
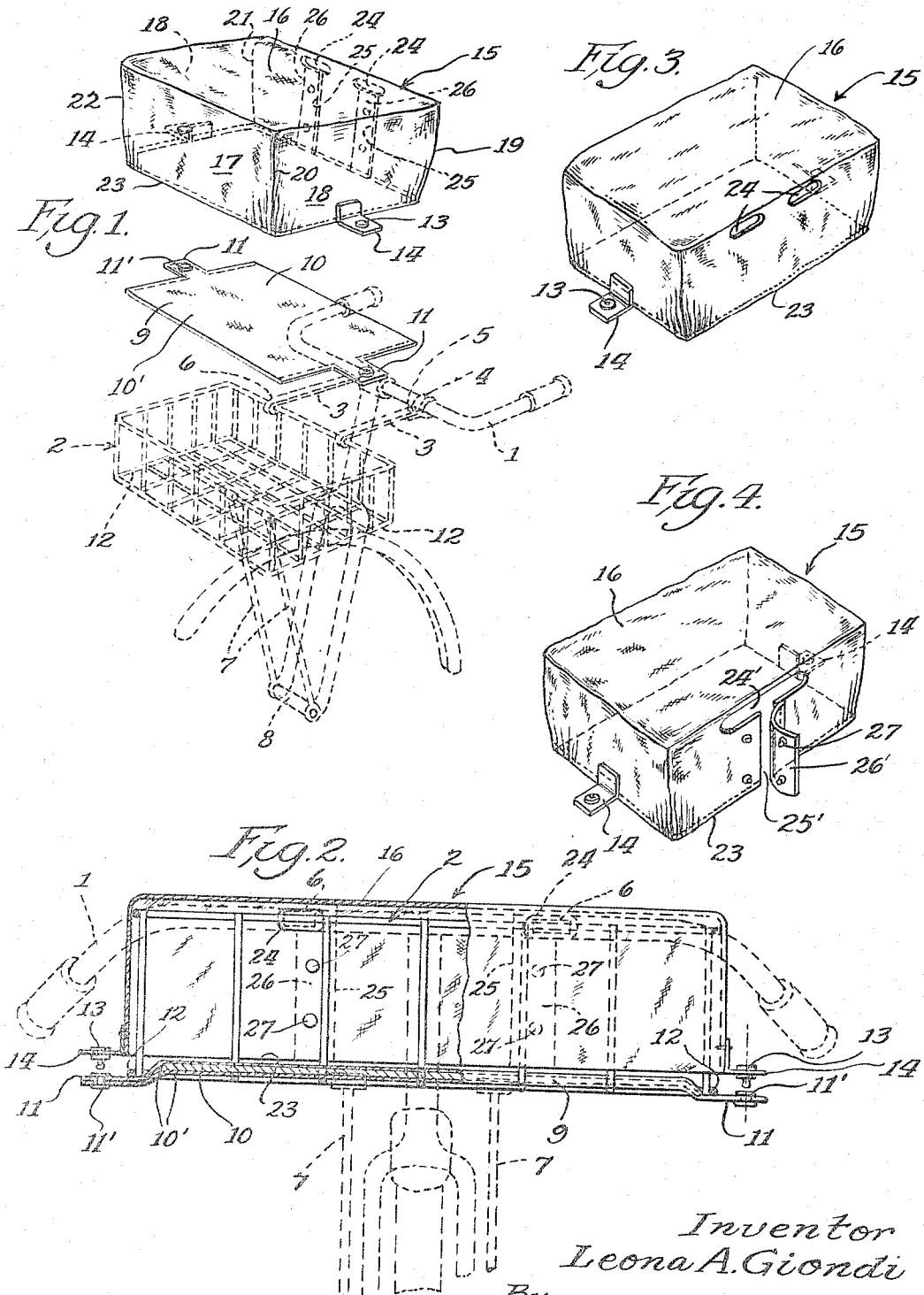
Inventor
Leona A. Giondi
By
Mann, Brown & McWilliams
Attys.

United States Patent Office 3,322,313
Patented May 30, 1967

3,322,313
BICYCLE CARRIER BASKET COVER
Leona A. Giondi, P.O. Box 304, Warrenville, Ill. 60555
Filed Jan. 21, 1966, Ser. No. 522,117
7 Claims. (Cl. 224—35)

This invention relates to covers for bicycle wire carrier baskets and particularly to covers for baskets mounted on the front of the bicycle and attached to the handle bars thereof.

During inclement weather or when the paving surface is wet, not only do objects such as books and other objects carried in bicycle carrier baskets become wet and soiled by reason of precipitation from the atmosphere, but by reason of splashing from the bicycle wheels and from passing vehicles.

It is an object of this invention to provide a cover which will protect objects carried in bicycle baskets from becoming wet and soiled.

It is another object of the invention to provide a cover which can be readily placed on and removed from a wire basket mounted on the front of a bicycle.

A further object of the invention is to provide a wire basket which will keep the contents thereof dry and unsoiled.

Further objects of the invention will become apparent from the following description and the drawing, of which:

FIGURE 1 is an exploded perspective view of the front end of a bicycle with a wire carrier basket mounted thereon and showing the cover adapted to fit the basket;

FIGURE 2 is a vertical partial cross-sectional view of a wire basket such as shown in FIGURE 1 with the cover elements in place on the basket;

FIGURE 3 is a perspective view of a modification of the top covering element of the invention looking downward thereat; and FIGURE 4 is a perspective view of another modification of a top covering element looking downward thereat.

Referring to the drawing, the numeral 1 represents the handle bars of a bicycle to which a wire basket 2 is fastened by means of brackets 3 adapted to be clamped to the handle bars by clamps 4 and screws 5. The outer ends 6 of the brackets are pivotally fastened to the upper edge of the basket. Braces 7 may be pivotally mounted on the bottom of the basket and fastened to the axle 8 of the front wheel of the bicycle. The basket and method of mounting it on the bicycle are conventional.

A flat rectangular bottom element 9 which is preferably made by covering a rigid member such as natural or composition board or plastic 10 with a weather-resistant covering 10' is adapted to fit inside the basket on the bottom thereof and cover substantially the entire bottom of the basket. Any flexible or pliable covering material that does not crack or become brittle upon change in atmospheric temperature and which is resistant to the passage therethrough of moisture may be used for covering the rigid bottom member. For example, I may use a webbed fabric covered or impregnated with plastic or elastomer. Weather-resistant cloth such as that used in the manufacture of raincoats may be used. The edges of the upper and lower layers of the weather-resistant covering for the bottom element are sewn or otherwise sided together to form an envelope enclosing the rigid member. Flexible tabs 11, preferably made of the same material as the envelope extend from diametrically opposite sides of the bottom elements. Tabs 11 are provided with fastening elements 11' such as the male or female members of a snap hook. Other fastening elements may be used instead of the tabs and snap hooks, such as tying ribbons. However, I prefer to use the tabs with the snap hooks for the reason that the tabs can be inserted under the end wire elements 12 at the bottom of the basket and be fastened to cooperating male or female snap hook elements 13 on tabs 14 mounted at the lower edges of covering element 15. Covering element 15 is also made of suitable weather-resistant material generally of the same type used for covering the rigid bottom member 9. The element 15 is preferably made from sheet material shaped and sewn to provide a top 16 adapted to fit snugly over the top of the basket 2 and side walls 17 and 18. It will be apparent that the covering element 15 can be cut from sheet material and made into the proper shape by sewing together the edges 19, 20, 21, and 22. Where suitable plastic material is used, the covering element 15 may be made by heat pressing the edges 19, 20, 21, and 22 together to seal them, or the element may be molded into the desired shape.

The bottom of covering element 15 is open and the bottom edge 23 is provided with elastic or a pull string sewn into or otherwise applied to the corners or to the entire bottom edge in order to draw the bottom edge 23 of the cover snugly around the bottom of the basket. The distance from the bottom edge to the top of the covering 15 is such that when the covering is placed on basket 2, the lower edge 23 will extend a short distance below the bottom end of the basket and fit snugly around it, by reason of the elastic or tie element in the bottom edge 23. The covering element 15 is then fastened to the bottom element 9 by engaging snap hook elements 13 on tabs 14 with the cooperating snap hook elements 11' on tabs 11. Since the tabs 11 extend beneath the wires 12 of the basket, the bottom 9 is held close to the bottom of the basket and the top element 15 is prevented from blowing open.

Covering element 15 is also provided with slots 24 aligned with brackets 3 and of sufficient size to closely accommodate brackets 3. Covering element 15 shown in FIGURE 3 may be placed on the basket by detaching the brackets from the clamps 4 and slipping the brackets through the slots 24, after which the brackets are then attached to the clamps; or the covering element 15 may be slipped over the basket without disturbing the brackets by slitting the covering element from the openings 24 to the bottom edge 23 along the lines 25, sewing a flap 26 to one edge of the slit, providing the flaps 26 with suitable snap hook elements 27, and providing the other side of the slit with cooperating snap hook elements as shown in FIGURES 1 and 2. The cover can be slipped over the top of the basket and the flaps then closed by snapping the hooks. In this manner the cover can be placed on or removed from the basket without detaching the brackets from the handle bars.

FIGURE 4 shows another modification of the top covering element differing from that shown in FIGURES 1 and 2 in that instead of having two openings 24 to accommodate brackets 3, a single opening or slot 24' is provided which is wide enough to accommodate both brackets. A single slit 25' is provided from the slot 24' to the bottom edge 23 of the covering element. To one edge of the slit is sewn or otherwise fastened flap 26' provided with snap hooks 27 to fasten to mating elements on the other side of the slit. Like the covering element shown in FIGURE 1, that shown in FIGURE 4 can be placed on the basket without detaching the brackets 3 from the handle bars and can be readily removed or placed on the basket.

It will be seen that a covering element 15 is provided which can be readily placed on a bicycle carrier basket and held snugly in place. It also will be evident that the covering element is capable of being easily placed on or removed from the basket. By means of the cooperating covering and bottom elements, the entire contents of the basket are protected against precipitation as well as splashing, and the two elements cooperate to hold each other in place on the basket.

I claim:
1. A bicycle wire carrier basket cover comprising:
   (a) a flexible weather-resistant covering element shaped to be placed over a bicycle wire carrier basket,
   (b) said covering element having an open bottom,
   (c) at least one opening in said covering in such position as to be aligned with and restricted in size and shape to accommodate brackets for fastening the basket to a bicycle, when said covering is in position on said basket,
   (d) a separate weather-resistant bottom element adapted to fit in and cover substantially the entire bottom of said basket,
   (e) fastening means extending from opposite sides of said bottom element, and
   (f) fastening means, adjacent the open end of said covering element, aligned and adapted to cooperate with the fastening means on said bottom element.
2. A bicycle cover in accordance with claim 1 in which said fastening means on said bottom means are flexible tabs, of sufficient length to extend outside said baskets, having one element of a snap-hook affixed thereto, and said fastening means on the cover element are flexible tabs having cooperating snap-hook elements affixed thereto.
3. A bicycle cover in accordance with claim 2 including
   (g) means for holding the bottom end of said covering element snugly against the bottom of said basket.
4. The combination comprising:
   (a) a wire carrier basket mounted on the front end of a bicycle and fastened to the handle bars thereof by at least one bracket,
   (b) an open-bottom flexible weather resistant covering element covering the top and sides of said basket,
   (c) openings in said covering element through which said brackets pass in close-fitting relationship,
   (d) a weather-resistant bottom element resting on the bottom of said basket and extending to the side walls thereof,
   (e) and means on said covering element to hold the bottom thereof snugly around the bottom of said basket.
5. The combination in accordance with claim 4 including
   (f) fastening elements extending outwardly of the basket beneath the adjacent wire thereof, from opposite sides of said bottom element, and
   (g) fastening elements on said covering element aligned with and adapted to coact with fastening elements on said bottom element.
6. The combination in accordance with claim 5 in which said fastening elements are flexible tabs equipped with male and female snap-hook elements.
7. The combination in accordance with claim 6 in which said covering element is provided with at least one closeable slit extending from said opening to the open bottom of the covering element whereby to allow said covering element to be placed on and removed from the basket without disturbing said brackets.

References Cited
UNITED STATES PATENTS

| | | | |
|---|---|---|---|
| 2,134,635 | 10/1938 | Le Boeuf | 224—42.1 |
| 2,700,493 | 1/1955 | Meier | 224—36 |
| 3,087,524 | 4/1963 | Dolnick | 150—52 |
| 3,087,585 | 4/1963 | Knuth et al. | 150—52 X |

GERALD M. FORLENZA, *Primary Examiner.*

HUGO O. SCHULZ, *Examiner.*

F. WERNER, *Assistant Examiner.*